United States Patent
Fujisawa

(10) Patent No.: US 8,278,385 B2
(45) Date of Patent: Oct. 2, 2012

(54) RUBBER COMPOSITE AND TIRE USING THE SAME

(75) Inventor: Hidetada Fujisawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 88 days.

(21) Appl. No.: 12/177,207

(22) Filed: Jul. 22, 2008

(65) Prior Publication Data

US 2009/0030135 A1    Jan. 29, 2009

(30) Foreign Application Priority Data

Jul. 27, 2007 (JP) .................. 2007-195899
Jun. 26, 2008 (JP) .................. 2008-167114

(51) Int. Cl.
*B60C 1/00* (2006.01)
*C08K 3/04* (2006.01)
*C08K 3/02* (2006.01)

(52) U.S. Cl. ............ 524/495; 524/496; 524/575.5; 152/450; 152/208; 152/209.1

(58) Field of Classification Search .......... 524/495, 524/496, 575.5; 152/450, 208, 209.1
See application file for complete search history.

(56) References Cited

FOREIGN PATENT DOCUMENTS

| EP | 0531975 A1 | 3/1993 |
|----|------------|--------|
| EP | 0661343 A1 | 7/1995 |
| EP | 0872514 A1 | 10/1998 |
| JP | 03149236 A | 6/1991 |
| JP | 05230290 A | 9/1993 |

OTHER PUBLICATIONS

Database WPI Week, Thomson Scientific, 1991-228228, London, GB.

*Primary Examiner* — James J Seidleck
*Assistant Examiner* — Deve E Valdez
(74) *Attorney, Agent, or Firm* — Sughrue Mion, PLLC

(57) ABSTRACT

The invention is to provide a rubber composite and tire using the rubber composite, which, when the rubber composite is used as the tread rubber of a tire, enables the tire to have high wear resistance and hence have a long life while presenting a low rolling resistance and enables an automobile that uses the tires to reduce fuel consumption during traveling. The rubber composite of the invention comprises 100 parts by weight of a rubber component composed of at least one kind of rubber, selected from a group of natural rubber, synthetic isoprene rubber and synthetic diene rubber and 10 to 100 parts by weight of a carbon black blended therein, the carbon black is specified to satisfy the relation $X/Y \geq 0.84$, where X is the mercury intrusion specific surface area (m2/g), measured by mercury porosimetry and Y is the CTAB specific surface area (m2/g). The tire of the invention is one that uses the above rubber composite as its tread portion.

6 Claims, No Drawings

RUBBER COMPOSITE AND TIRE USING THE SAME

This Nonprovisional application claims priority under 35 U.S.C. §119(a) on Patent Application No. 2007-195899 filed in Japan on 27 Jul. 2007 and Patent Application No. 2008-167114 filed in Japan on 26 Jun. 2008, the entire contents of which are hereby incorporated by reference.

BACKGROUND OF THE INVENTION (1) Field of the Invention

The present invention relates to a rubber composite and a tire using the composite. Detailedly, the present invention relates to a rubber composite and a tire using the composite, whereby an automobile or the like using the tires can be reduced in fuel consumption.

(2) Description of the Prior Art

As attention to environment and safety has increased, demands on tires for low fuel consumption by reduction of rolling resistance and for improvement of wear resistance have become stronger.

In order to promote tire's wear resistance, a rubber composite for tires, composed of diene rubber blended with a carbon black having a CTAB specific surface area (abbreviation of cetyltrimethylammonium bromide adsorption specific surface area) of 110 to 170 m$^2$/g and a 24M4 DBP absorption (DBP absorption after 24M4 compression) of 100 to 130 ml/10 g has been proposed (see Japanese Patent Application Laid-open Hei 05-230290). Also, making the CTAB specific surface area smaller, in other words, making the primary particle size of carbon black greater enlarges the distance between carbon black primary particles in the rubber so as to reduce the occasion of primary particles being rubbed against each other due to rubber deformation, hence making it possible to suppress heat generation and reduce rolling resistance.

SUMMARY OF THE INVENTION

When the carbon black in the rubber composite has a small CTAB specific surface area, the carbon black particles contact the rubber polymer in less area so that it is impossible with the carbon black to provide sufficient reinforcement. As a result, there is the problem that wear resistance of the tire becomes lowered. Accordingly, there has been a demand for a rubber composite that contains a carbon black having excellent properties, blended therein in order to enable the tire to exhibit high wear resistance and low rolling resistance.

In order to solve the above problem, it is an object of the present invention to provide a rubber composite which, when it is used as tread rubber of a tire, enables the tire to have high wear resistance and hence have a long life while presenting a low rolling resistance. It is another object of the present invention to provide a rubber composite and a tire using the composite, which can reduce fuel consumption during driving of an automobile that uses the tires.

In order to achieve the above object, the inventor hereof have eagerly investigated and studied the properties of carbon black from a viewpoint different from that of the conventional one. As a result, he found that reinforcement to the rubber with carbon black can be increased by use of a carbon black, having a CTAB specific surface area equivalent to that of the conventional one or having an equivalent primary particle size, and having a greater specific surface area, measured based on the intrusion of mercury under pressure by the mercury porosimetry, than the conventional specific surface area, measured based on the intrusion of mercury under pressure, which was previously small, and has completed the present invention.

Of the pores of carbon black, mercury will not be intruded under pressure into micro pores having a size of smaller than 6 nm. Mercury can intrude into relatively large pores equivalent to or greater than meso-pores which rubber component can easily adsorb. That is, the specific surface area measured by the intrusion of mercury represents the specific surface area of the portions having meso pores or greater on the carbon black surface, and when this measurement is large, it is possible to expect a large contact surface area with rubber component even if the CTAB specific area is equivalent, hence it is possible to enhance reinforcement while suppressing heat generation due to rubbing between primary particles.

That is, a rubber composite of the present invention comprises: a rubber component composed of at least one kind of rubber, selected from a group of natural rubber, synthetic isoprene rubber and synthetic diene rubber and a carbon black blended therein, the carbon black is specified to satisfy the relation X/Y≧0.84, where X is the mercury intrusion specific surface area (m$^2$/g), measured by mercury porosimetry and Y is the CTAB specific surface area (m$^2$/g).

It is preferable that the blending is specified such that 10 to 100 parts by weight of the carbon black is blended to 100 parts by weight of the rubber component.

The carbon black is preferably specified such that its CTAB specific surface area Y (m$^2$/g) falls within the range of 80≦Y≦160 and 24M4 DBP absorption Z (ml/100 g) falls within the range of 80<Z<130.

Further, the tire of the present invention is characterized by use of the above rubber composite as its tread.

The conventional carbon black is produced by aggregating primary particles to form its structure, and many fine pores that do not allow polymers to enter are generated in this structure. The rubber composite of the present invention uses a carbon black which is manufactured by a distinct method from the conventional carbon black manufacturing method so that the carbon black has a structure in which fine pores that prohibit polymers from entering are reduced in number. Specifically, instead of the conventional carbon black having a ratio of the mercury intrusion specific surface area X to the CTAB specific surface area Y, X/Y of less than 0.84, carbon black with its X/Y ratio equal to 0.84 or greater, or having a greater number of fine pores that are effective in polymer adsorption, is blended with the rubber component. When the thus obtained rubber composite is used as the tread rubber of a tire, it is possible to markedly improve wear resistance without degrading the rolling resistance performance of the tire. It is also possible to reduce the consumption of fuel during driving of an automobile using the tires. Further, the carbon black preferably has a CTAB specific surface area Y (m$^2$/g) falling within the range of 80≦Y≦160 and a 24M4 DBP absorption Z (ml/100 g) falling within the range of 80≦Z≦130. If the CTAB specific surface area is less than 80 m$^2$/g, the compound presents poor wear resistance. If it exceeds 160 m$^2$/g, the dispersibility of carbon black particles into the rubber component lowers and the workability degrades. A tire with its tread formed of such a rubber composite presents poor low-rolling resistance performance. When the 24M4 DBP absorption Z is less than 80 ml/100 g, the wear resistance lowers, whereas with a 24M4 DBP absorption of 130 ml/100 g or above, the degree of vulcanization of the rubber composite markedly lowers and the workability degrades.

DESCRIPTION OF THE PREFERRED EMBODIMENTS

The preferred embodiment of the present invention will hereinafter be described in detail.

The rubber component of a rubber composite of the present invention is at least one kind of rubber, selected from a group of natural rubber, synthetic isoprene rubber and synthetic diene rubber. Examples of synthetic diene rubber include styrene-butadiene copolymers (SBR), poly-butadiene (BR), polyisoprene (IR), butadiene-isoprene copolymers, butadiene-styrene-isoprene copolymers, acrylonitrile-butadiene copolymers, chloroprene rubber, butyl rubber, halide butyl rubber and the like. These rubbers and natural rubber may be used alone or in combination of two or more kinds.

The characteristics of the carbon black used in the present invention should satisfy the relation $X/Y \geq 0.84$, where $X$ ($m^2/g$) is the mercury intrusion specific surface area, measured by mercury porosimetry and $Y$ ($m^2/g$) is the CTAB specific surface area.

Further, it is preferred that CTAB specific surface area $Y$ ($m^2/g$) falls within the range of $80 \leq Y \leq 160$ and 24M4 DBP absorption $Z$ (ml/100 g) falls within the range of $80 < Z < 130$.

Mercury intrusion specific surface area $X$ was measured using a mercury porosimeter 2000, manufactured by Quantachrome Instruments (selling agency: Yuasa Ionics Inc.). In this apparatus, the contact angle $\theta = 140°$ and the surface tension of mercury $\tau = 480$ dyne/cm were adopted in the Washburn's equation. Since 30,000 vapor pressure (PSIA) was applied, the range of measuring pore size was about 6 nm or greater.

CTAB specific surface area $Y$ is the abbreviation of cetyl-trimethylammonium bromide adsorption specific surface area, and the above value is the value obtained by the measurement conforming to ISASTM D3765-80. The above 24M4 DBP absorption $Z$ is the abbreviation of dibutyl phthalate oil absorption quantity and is the value obtained by the measurement conforming to ASTM D3493-85a.

There are some kinds of carbon black, such as channel black, furnace black, acetylene black, thermal black, etc., depending on manufacturing methods. The blended amount of the above carbon black is preferably 10 to 100 parts by weight relative to 100 parts by weight of the rubber component, more preferably 20 to 80 parts by weight. The content of carbon black within the above range can present adequate enough wear resistance and desirable performance.

In the present invention, of the pores of carbon black, mercury will not be intruded under pressure into micro pores having a size of smaller than 6 nm. Carbon black used in the present invention is one that has relatively large pores as large as or greater than meso pores which rubber component can easily adsorb and has few pores having a radius of 50 angstrom or below. Accordingly, the mercury intrusion specific surface area $X$ of the carbon black of the present invention is preferably as close to the CTAB specific surface area $Y$ as possible. That is, $X/Y$ is at least 0.84 or greater, preferably equal to or greater than 0.85, as mentioned above.

In this case, carbon black is easily acclimated with natural rubber or diene synthetic rubber in an early stage of kneading, and the carbon black may have greater contact area with the rubber component even if it has an equivalent CTAB specific surface area. Accordingly, it is possible to inhibit heat generation due to rubbing between primary particles and also increase the strength of rubber.

Other than above, as preferably powder properties, the following specifications can be mentioned. However, it goes without saying that the present invention is not limited by these numeral specifications.

CTAB specific surface area $Y$ ($m^2/g$) preferably falls within the range of $80 \leq Y \leq 160$ and more preferably falls within the range of $90 \leq Y \leq 150$. In this range, carbon black presents good dispersibility in the rubber component and also presents preferable workability, and the resultant rubber composite can present high enough wear resistance and low enough rolling resistance when it is used for tires. When the CTAB specific surface area is lower than 80 $m^2/g$, the wear resistance is lowered, whereas it exceeds 160 $m^2/g$, the dispersibility of carbon black into the rubber component degrades, hence the resultant rubber composite present poor workability. Also, when this rubber composite is used for tread rubber, the low-rolling resistance of the tire is degraded.

Further, 24M4 DBP absorption $Z$ (ml/100 g) preferably falls within the range of $80 < Z < 130$ and more preferably falls within the range of $90 \leq Z \leq 120$. In the above range, if the 24M4 DBP absorption is equal to lower than 80 ml/100 g, the wear resistance is lowered, whereas it exceeds 130 ml/100 g, the degree of vulcanization of the rubber composite markedly lowers and the workability degrades.

In the rubber composite of the present invention, other than the above-described carbon black, compounding ingredients that are usually used in industrial practice, such as reinforcing fillers, vulcanizing agents, vulcanization accelerators, vulcanization adjuvants, softening agents, age resisters, etc., may be blended as appropriate. The rubber composite can be obtained by kneading the compound using a confined kneader such as a Bunbury mixer, Inter mixer, etc., or another kneader such as a roll machine etc.

The tire of the present invention is characterized by use of the rubber composite of the present invention as the tread thereof. Materials other than the tread and the tire structure are not particularly limited, and can be chosen as appropriate. The tire of the present invention can be filled with nitrogen or any other inert gas, not limited to air.

EXAMPLES

Now, the present invention will be described in further detail taking examples. However, the present invention should not be limited to the following examples.

The test rubber composites in examples and comparative examples shown in Tables 3 and 4 below were produced by kneading the compounds shown in Table 1 below as their base.

Concerning carbon black in each example, carbon black obtained by the following manufacturing process under the conditions specified in Table 2, or carbon black available on the market was used.

<Carbon Black Manufacturing Process>

Carbon black manufacturing equipment is an approximately cylindrical furnace. Arranged at the upstream end of the furnace is a fuel input port and an air inlet port. A combustion gas generation chamber for generating a high-temperature combustion gas flow by mixing a combustion gas and air (gas containing oxygen) is formed in the upstream part of the furnace. The combustion gas generation chamber is 1000 mm in length with its inside diameter of 595 mm φ. Provided downstream of the combustion gas generation chamber is an intermediate transfer chamber (including a material input chamber) that is formed to be gradually smaller in inside diameter. The intermediate transfer chamber is 1700 mm in length. Its narrowest part on the most downstream side is 70 to 300 mm in inside diameter (inside minor axis diameter and major axis diameter). Further, a plurality of mount holes for material loading nozzles (loading positions) are formed on the side wall at the positions 100 mm and 200 mm upstream from the narrowest part on the most downstream side of the intermediate transfer chamber. Eight mount holes are formed on the circumference of the furnace. The necessary material nozzle is put in each mount hole in conformity with the processing conditions. The sectional shape of the furnace interior across the position where material nozzles are mounted is circular or elliptic. When it is elliptic, the ratio of the major axis (the maximum distance) to the minor axis (the minimum distance) is regarded as one of the processing conditions.

A carbon black production chamber is arranged downstream of the intermediate transfer chamber. Coolant inlet ports for stopping reaction are formed in the generation chamber at positions 2000 mm and 3000 mm away from the aforementioned narrowest part. The rapid cooling position is determined by the inlet port at which a coolant supply means is set.

In this carbon black manufacturing equipment, a weight oil was used as the raw material and A-type heavy oil was used as the fuel to prepare different types of carbon black, a to j under the conditions shown in Table 2 below.

<Carbon Black on the Market>

Carbon black N330 (VULCAN 3: a product of Cabot Corporation)

Carbon black N234 (VULCAN 7H: a product of Cabot Corporation)

Carbon black N134 (VULCAN 10H: a product of Cabot Corporation)

TABLE 1

| Compound component | Blended quantity (parts by weight) |
| --- | --- |
| Natural rubber | 100 |
| Caron black *1 | 50 |
| Stearic acid | 3 |
| Zinc white | 5 |
| Vulcanization accelerator NS *2 | 1 |
| Sulfur | 1.5 |

*1: Carbon blacks shown in Table 2 and carbon blacks on the market were used.
*2: N-t-butyl-2-benzo thiazolyl sulfenamide

TABLE 2

| | Samples | | | | |
| --- | --- | --- | --- | --- | --- |
| Conditions | a | b | c | d | e |
| Inlet air quantity (kg/hr) | 5000 | 5500 | 7000 | 7000 | 7000 |
| Preheated air temperature (deg. C.) | 600 | 600 | 600 | 600 | 600 |
| Input fuel quantity (kg/hr) | 230 | 250 | 350 | 350 | 350 |
| nput raw material quantity (kg/hr) | 1510 | 1540 | 1560 | 1420 | 1220 |
| Inlet pressure (MPa) | 3 | 3.2 | 3.2 | 2.8 | 1.8 |
| Preheated raw material temperature | 200 | 200 | 200 | 200 | 200 |
| Number of loading | 8 | 8 | 8 | 8 | 8 |
| Position of loading (mm) | 200 | 200 | 100 | 100 | 100 |
| Position of rapid cooling (mm) | 3000 | 3000 | 2000 | 2000 | 2000 |
| Maximum distance/minimum distance | 2.93 | 2.93 | 3.42 | 3.42 | 3.42 |

TABLE 2-continued

| | Samples | | | | |
| --- | --- | --- | --- | --- | --- |
| Conditions | f | g | h | i | j |
| Inlet air quantity (kg/hr) | 6000 | 5500 | 6000 | 7000 | 7000 |
| Preheated air temperature (deg. C.) | 600 | 600 | 600 | 600 | 600 |
| Input fuel quantity (kg/hr) | 300 | 250 | 300 | 350 | 350 |
| nput raw material quantity (kg/hr) | 1520 | 1430 | 1420 | 1290 | 1140 |
| Inlet pressure (MPa) | 3 | 2.8 | 2.8 | 2 | 1.6 |
| Preheated raw material temperature | 200 | 200 | 100 | 100 | 100 |
| Number of loading | 8 | 8 | 8 | 8 | 8 |
| Position of loading (mm) | 100 | 200 | 100 | 100 | 100 |
| Position of rapid cooling (mm) | 2000 | 3000 | 2000 | 2000 | 2000 |
| Maximum distance/minimum distance | 3.42 | 1 | 1 | 1 | 1 |

Each of the obtained rubber composites was used as the tread rubber to prepare 11R-22.5 truck tires by the usual method. These tires were evaluated as to rolling resistance and wear resistance performances in the following methods.

(1) Rolling Resistance Performance

While the truck tire was rotated on a drum, the rolling resistance was measured. The rolling resistance of the tire in comparative example 3 was set at 100, and the rolling resistance performances of the other cases were represented by indexes. The smaller the index, the smaller or better the rolling resistance performance is.

(2) Wear Resistance Performance

The above tires were put on a vehicle, wear of the tread groove was measured after running of 40,000 km. The reciprocal of the reduction of the groove in comparative example 3 was set at 100 and the wear resistance performances of the other cases were represented by indexes. The greater the index, the better the wear resistance performance is.

The above results are shown in Tables 3 and 4.

TABLE 3

| | Example | | | | | |
| --- | --- | --- | --- | --- | --- | --- |
| Example | 1 | 2 | 3 | 4 | 5 | 6 |
| Characteristics of applied carbon black | | | | | | |
| Carbon black type | a | b | c | d | e | f |
| CTAB ($m^2/g$) | 81 | 92 | 121 | 136 | 157 | 108 |
| 24M4DBP (ml/100 g) | 112 | 111 | 103 | 104 | 108 | 106 |
| Specific surface area by mercury intrusion ($m^2/g$) | 71 | 78 | 105 | 117 | 136 | 92 |
| X/Y value | 0.88 | 0.85 | 0.87 | 0.86 | 0.87 | 0.85 |
| Evaluation on tire performance | | | | | | |
| Rolling resistance performance | 87 | 93 | 99 | 104 | 108 | 96 |
| Wear resistance performance | 91 | 98 | 107 | 119 | 127 | 105 |

TABLE 4

|  | Comparative Example | | | | | | |
| --- | --- | --- | --- | --- | --- | --- | --- |
| Comparative Example | 1 | 2 | 3 | 4 | 5 | 6 | 7 |
| Characteristics of applied carbon black | | | | | | | |
| Carbon black type | N330 | N134 | N234 | g | h | i | j |
| CTAB (m²/g) | 74 | 135 | 123 | 88 | 112 | 148 | 162 |
| 24M4DBP (ml/100 g) | 90 | 103 | 100 | 113 | 105 | 102 | 104 |
| Specific surface area by mercury intrusion (m²/g) | 61 | 108 | 92 | 68 | 87 | 118 | 124 |
| X/Y value | 0.82 | 0.80 | 0.75 | 0.77 | 0.78 | 0.80 | 0.77 |
| Evaluation on tire performance | | | | | | | |
| Rolling resistance performance | 84 | 104 | 100 | 90 | 97 | 107 | 110 |
| Wear resistance performance | 78 | 111 | 100 | 88 | 96 | 110 | 115 |

From Tables 3 and 4 above, as compared with Comparative Example 4, Example 1 is improved in wear resistance performance (91) while keeping low-rolling resistance performance (87). Example 2 is improved in rolling resistance performance while keeping wear resistance performance. Examples 3-5 are markedly improved in wear resistance performance though it presents slightly lower rolling resistance performance.

The rubber composite of the present invention is a rubber component with a specific carbon black compounded therein. Application of this rubber composite to the tread of a tire makes it possible to provide a tire having an improved wear resistance and longer tread life and presenting low rolling resistance. Accordingly, the automobile using the tires can drive with reduced consumption of fuel. Thus, the present invention is applicable and advantageous in industries.

What is claimed is:

1. A rubber composite comprising: a rubber component composed of at least one rubber, selected from a group of natural rubber, synthetic isoprene rubber and synthetic diene rubber and a carbon black blended therein, the carbon black is specified to satisfy the relation X/Y≧0.84, where X is the mercury intrusion specific surface area (m²/g), measured by mercury porosimetry and Y is the CTAB specific surface area (m²/g);
   wherein the carbon black is specified such that its CTAB specific surface area Y (m²/g) falls within the range of 80≦Y≦157 and 24M4 DBP absorption Z (ml/100 g) falls within the range of 80≦Z≦130.

2. The rubber composite according to claim 1, wherein 10 to 100 parts by weight of the carbon black is blended to 100 parts by weight of the rubber component.

3. A tire having a tread of a rubber composite comprising: a rubber component composed of at least one rubber, selected from a group of natural rubber, synthetic isoprene rubber and synthetic diene rubber and a carbon black blended therein, the carbon black is specified to satisfy the relation X/Y≧0.84, where X is the mercury intrusion specific surface area (m²/g), measured by mercury porosimetry and Y is the CTAB specific surface area (m²/g),
   wherein the carbon black is specified such that its CTAB specific surface area Y (m²/g) falls within the range of 80≦Y≦157 and 24M4 DBP absorption Z (ml/100 g) falls within the range of 80<Z<130.

4. The tire according to claim 3, wherein the rubber composite includes 100 parts by weight of the rubber component and 10 to 100 parts by weight of the carbon black blended therein.

5. The rubber composite according to claim 1, wherein the carbon black is specified such that its CTAB specific surface area Y (m²/g) falls within the range of 80≦Y≦136 and 24M4 DBP absorption Z (ml/100 g) falls within the range of 80<Z<130.

6. The tire according to claim 3, wherein the carbon black is specified such that its CTAB specific surface area Y (m²/g) falls within the range of 80≦Y≦136 and 24M4 DBP absorption Z (ml/100 g) falls within the range of 80<Z<130.

* * * * *